United States Patent [19]

Engdahl et al.

[11] Patent Number: 4,913,937

[45] Date of Patent: Apr. 3, 1990

[54] COMPOSITE ARTICLES USING MELTABLE RESIN HOLDING THREADS

[75] Inventors: Roger A. Engdahl, St. Paul; Todd Drummond, Maple Grove, both of Minn.

[73] Assignee: Xerkon Inc., Minneapolis, Minn.

[21] Appl. No.: 156,937

[22] Filed: Feb. 17, 1988

[51] Int. Cl.$^4$ ............................................. B05D 3/02
[52] U.S. Cl. .................................... 427/314; 427/412
[58] Field of Search ............. 428/102, 103, 104, 227, 428/252, 253, 286, 287, 288, 296; 112/262.1, 262.3; 427/314, 412

[56] References Cited

U.S. PATENT DOCUMENTS

| | | | |
|---|---|---|---|
| 2,431,977 | 12/1947 | Alderfer | 28/74 |
| 4,445,951 | 5/1984 | Lind et al. | 156/93 |
| 4,484,459 | 11/1984 | Hutson | 66/84 |
| 4,567,738 | 4/1986 | Hutson et al. | 66/85 |
| 4,664,961 | 5/1987 | Vees et al. | 428/102 |
| 4,680,213 | 7/1987 | Fourezon | 428/105 |
| 4,681,049 | 7/1987 | Vees et al. | 112/262.3 |
| 4,741,873 | 3/1988 | Fischer et al. | 264/25 |
| 4,800,113 | 1/1989 | O'Connor | 428/175 |

*Primary Examiner*—Marion C. McCamish

[57] ABSTRACT

A process for making a fiber form by preparing structural fabric comprised of a plurality of plies of structural fibers and sewing the fabric with at least one course of resin holding thread. The sewn fiber form is then impregnated with a curable resin and cured to prepare the finished fiber reinforced composite article.

1 Claim, No Drawings

COMPOSITE ARTICLES USING MELTABLE RESIN HOLDING THREADS

BACKGROUND OF THE INVENTION

1. Field of the Invention

The invention relates to composite structural articles, and more specifically to composite articles which are prepared from structural fibers or stranded fibers sewn together by means of meltable resin holding thread and subsequently infused with a curable resin.

2. Discussion of the Background

Increasing demands in the transportation industry, including the rail, marine and aerospace fields, coupled with the increasing cost of energy, has placed a high demand on structural materials that are of extreme strength, durability and at the same time, lightweight. In particular, aerospace applications require a very high standard of safety and performance. These high standards place extremely critical demands on the structural materials used in aerospace applications and require a level of performance over and above standard lightweight metal alloys.

Thus, replacements for conventional alloys and even lighter weight alloys such as aluminum-lithium are constantly being sought. One such group pf substitutes includes the composites field, generally including fiber reinforced plastics. One important type of produce within this field is the structural article made by infusing or impregnating a stitched fiber form comprised of a plurality of plies of knit fabric made of structural fiber with a curable resin and thereafter molding the product to provide a stiff, lightweight product which is very cost effective to manufacture. Typical structural fibers may be prepared from fiberglass, Kevlar ®, boron and carbon. U.S. Pat. Nos. 4,681,049; 4,664,961; 4,567,738 and 4,484,459, among others disclose examples of such fiber forms and composite products.

The various plies of the knitted fabric comprised of structural fiber are assembled and may be stitched together. This assembly (fiber form) is then generally molded or shaped into the approximate shape of the structural article desired, then stitched in one or more directions to secure the fiber form in the desired oriented position. This "perform" is then infused or impregnated with a resin which is subsequently cured to yield the composite article.

The yarns used to knit the structural fibers together into fabrics and the fabric assembly stitching threads (generically, holding means) are generally polyester or polyamide threads such as Kevlar ®. These fabric knitting yarns and stitching threads remain in position throughout the resin impregnation step and can also be found in the finished composite article.

Such knitted fabric fiber forms molded into composite articles offer the industry a highly cost effective manufacturing process. The knitting and stitching process results in a distribution of fibers in the composite which is different from undirectional prepreg tape composites. Such distribution leads to differences in mechanical properties of the composite articles. Knitted fabric composites are generally much stronger and stiffer than woven material composites and somewhat less strong in some aspects compared to undirectional tape composites.

When knitting or stitching with conventional holding means such as polyester or polyamide thread, the uniform distribution of the structural fibers is disturbed giving rise to resin rich areas. These resin rich areas may limit the full translation of the constituent material properties into the composite material. As the fabrics are assembled with secondary knitting and assembly operations, the structural fibers are deformed slightly as knitting yarn or other holding means passes around or through them, reducing the uniformity of distribution of fibers within each ply. Subsequent stitching of knitted fabric plies often involves further penetration of individual tows in the plies, thus causing a local distortion or waviness from the desired alignment or orientation. This waviness of the fibers may lead to the earlier onset of compression strength failure of these composite materials relative to materials with straight fibers. The deformed microstructure may also be detrimental to other matrix dominated composite mechanical properties such as shear strength.

Further, some conventional knitting yarns and stitching threads have low adhesion potentials for certain resins which surround all the fibers in the composite to form chemical and mechanical bonds. This low adhesion with some resins may result in knit yarn or stitch thread disbonding and may contribute to the formation of microcracks within the composite under thermal loads.

The conventional knitting yarns or stitching threads also generally have different thermal and mechanical properties relative to the resin. For composites made from knit fabrics the use of conventional knitting yarns and stitching threads may produce non-uniform structural fiber distributions and local distortions in the orientation of the structural fibers giving rise to stress points under thermal and mechanical loading. This may contribute to the disbonding or the formation of microcracks as noted above.

Conventional fiber reinforced composite materials, even those having resin rich spaces within the fiber network as described above, have satisfactory performance characteristics for most marine and aerospace applications. However, the aerospace field is placing ever increasing demands on the performance characteristics of structural materials intended for aerospace applications. This is particularly true in the field of military aerospace applications where levels of performance over and above that of conventional composite materials are required. The increasingly severe conditions encountered in military aerospace applications require increasingly severe safety and performance standards.

Accordingly, a need exists for a method of preparing fiber reinforced composite materials with performance characteristics which exceed those of conventional composite materials at a reasonable cost. New composite materials and methods of preparing them contribute greatly to technical advances in aerospace applications.

SUMMARY OF THE INVENTION

Accordingly, one object of the present invention is to provide a process for preparing a shaped fiber form which does not give rise to resin rich spaces in the final composite article.

A further object of the invention is to provide a method of preparing a fiber form which enables the structural fibers within the knitted plies to relax during the subsequent resin curing process and thereby reestablish a uniform structural fiber orientation and distribution.

These and other objects which will become apparent from the following specification have been achieved by the inventive process for making a dry fiber form and by the fiber form so produced. In the process of this invention, dry structural fiber forms which are comprised of a plurality of knit fabric plies of structural yarns are prepared with knit yarns and sewing threads made from a meltable resin material, designated resin holding threads, as their function is to "hold" the assembly together until curing.

Each fabric ply is comprised of a plurality of plies of structural fibers. These structural fibers in knitted or non-woven fabric are held together by knit yarns. The resin holding threads may be used (as the knit yarns) for intralayer and/or interlayer knitting or stitching and additionally may be used to hold the assembled fabrics in a more complex three dimensional configuration. By "intralayer" stitching is meant the stitching within a layer of structural fabric.

The resulting fiber form contains resin holding threads which have a melting temperature sufficiently high that they do not melt during a resin infusion process. However, during a subsequent heating step for liquidying and/or curing the resin, the resin holding threads melt, thereby allowing the structural fibers of the knitted fabric to move and relax. The structural fibers relax or spread into spaces created by the knitting or sewing operation and which would otherwise be filled with resin and therefore eliminate the resin rich spaces in the final cured product. The reduced structural performances associated with these spaces and the distortion associated with stitching are thereby avoided.

DETAILED DESCRIPTION OF THE PREFERRED EMBODIMENTS

The structural fabric employed in the present process may be woven or non-woven. The structural fabrics are comprises of a plurality of plies of structural fibers which generally have a high modulus of elasticity (Young's) in excess of 8–10 million psi. Structural fibers in knitted or non-woven fabric are held together by knit yarns. Structural fibers which are suitable for use in the present process include forms of fiberglass, most carbon yarns, as well as polymeric yarns such as polyamides and polyaramides. Also suitable are hybrid yarns which may have a lower modulus but generally have very high tensile strength, such as nylon. Preferred structural fibers are comprised of fiberglass, carbon and polyaramides with carbon and the polyaramide Kevlar ® being particularly preferred.

In order to form a composite part, the structural fabric must be shaped into a perform which very nearly approximates the final desired shape of the composite article. An article with virtually any shape, from single flat strip-shaped pieces to articles having complex shapes involving many angles and curves can be produced. If shaping is necessary, the shaping process can be done by any suitable conventional method. The shaping operation is preferably performed through the use of an appropriate automated or semi-automated molding operation. A preferred process for performing the shaping operation is disclosed in U.S. Pat. No. 4,681,049 and 4,664,961.

The resin holding threads of the present invention may be used for intralayer and/or interlayer knitting or stitching and additionally may be used to hold the assembled fabrics in a more complex 3-dimensional configuration. By "intralayer stitching" is meant stitching within a layer of structural fabric. Intralayer stitching is generally used to maintain the parallel orientation of the individual fibers within the nonwoven fabric. By "interlayer stitching" is meant stitching or knitting between individual fabric layers, whereby several plies are stitched together to form a multiple ply fabric. If desired, the assembled fabric plies may be arranged in a given conformation and held in position by additional stitching with resin holding threads. The resin holding threads of the present invention are, therefore, suitable for all types of stitching and knitting used with fabrics made of structural fibers in the production of fiber reinforced plastics.

The sewing machine used in the present method can be any conventional, industrial type sewing machine, provided that the actual head and needle are of sufficient strength and size to penetrate the fiber form which can be 100 plies or more thick.

After the fiber form has been prepared, it is infused or impregnated with a curable resin. The fiber form may be saturated with resin by using any suitable process. Such processes include processes in which the resin is applied at ambient temperatures or at elevated temperatures and include processes by which the resin infuses the fiber form under the action of gravity or the application of superatmospheric or subatmoshperic pressures. Basic resin injection processes and resin infusion processes such as for example a resin film infusion process (RFI) are particularly suitable. An example of such a process is described in U.S. Pat. No. 4,622,091.

Once the fiber form has been saturated with a curable resin, the saturated fiber form is molded to its final shape while the resin is cured. Curing may be accomplished by any means of curing which employs heat and/or pressure and which cures the matrix resin and at least partially melts the resin holding threads. Curing may be accomplished in any suitable curing chamber.

The resin holding threads may be comprised of any suitable resin so long as the resin may be drawn into a thread or yarn and exhibits an appropriate resin melt window. By "resin melt window" is meant a range of temperatures in which resin holding threads resist melting in the temperature range which occurs during the resin infusion process and yet at least partially dissolves or melts during the temperatures which occur during the resin curing stage. The use of a particular resin will therefore depend on the temperatures at which the resin infusion and resin curing processes are conducted. The infusion and curing temperatures will, obviously, depend on the specific curable resin used to form the composite article.

When the infused resin is applied at ambient temperatures, the "melt window" will have only an upper limit, thereby requiring only that the resin holding threads melt during the resin curing process. Since the resin is infused at lower temperatures, the behavior of the resin holding threads is not critical at these lower temperatures so long as the yarn fibers are maintained in their desired position.

It should be noted that it is not critical that the resin holding thread melt exactly at the "curing temperature". Rather, it is sufficient that the resin holding thread melt within a temperature range which includes the curing temperature since the fiber form is generally held in position by a mold within the curing chamber during the curing operation. Therefore, the resin holding threads may melt at a temperature before or after the actual "curing temperature" without being detrimental to the final composite article.

Preferably, the resin holding threads are comprised of a resin having properties which closely approximate or are identical to the curable matrix resin. Although it is not essential that the resin holding threads be identical with the curable resin, this represents a preferred embodiment since laminate properties are maximized with the use of identical curable resin and resin holding threads.

A wide variety of resins are suitable for both the curable matrix resin and the resin holding thread. Any resin having appropriate viscosity, strength, curing temperature, processability and yarn adhesion properties may be used. Specific resins may be chosen to provide specific additional properties such as corrosion resistance, heat and electrical insulating properties, and chemical resistance. Suitable resins include, for example, olefin polymers, polyamides, nylon, styrene plastics, acrylonitrile polymers, polycarbonates, polyesters, isocyanates, polyurethanes and epoxy resins. Among particularly preferred resins are variations of nylon, including nylon-12. Resin materials in addition to those specifically noted above are considered to be within the scope of the present invention.

Particulary preferred matrix resins are epoxy, peek, BMI, vinyl ester and polyester resins. Particularly preferred resin holding threads are therefore prepared from these same resins with resin holding threads made from epoxy resins, nylons and polycarbonates being most preferred.

It is not necessary that the resin holding threads completely dissolve or become homogeneous with the curable resin matrix. It is sufficient that the resin holding thread melt or dissolve to an extent sufficient to allow the structural yarn fibers to relax and thereby occupy the resin rich spaces created during the sewing or knitting operation. The resin holding thread may be the same resin as the curable resin matrix or may comprise a different resin, so long as the melt window characteristics noted above are maintained.

The resin holding threads may be used for intralayer and interlayer stitching and for holding the assembled yarn plies in a given conformation. The resin holding threads used in each of these applications may have conventional fibers diameters and tensile strength, flexibility and other structural parameters. The resin threads should be of conventional dimensions so that they may be used on sewing machines generally used in these applications. The resin holding threads may be drawn by conventional drawing processes to achieve the desired structural dimensions and properties.

The process of the present invention will now be further described with reference to a specific embodiment. This embodiment is given for illustration only and is not intended to limit the invention in any way.

Structural fibers for use in fiber reinforced plastic composites are well known and may exist as woven or non-woven fabrics. The non-woven fibers of the fabric are generally unidirectional within a single ply and the structural article may consist of one or more of such plies. Structural composites having as many as one hundred plies or more are typically used. The unidirectional fibers may be unbiased, that is, being substantially oriented at 0° or 90° to the major axis in the fiber composite, or may be biased, i.e. the fibers of any particular layer may be substantially oriented at an angle other than 0° or 90° to the major axis. Structural fabrics as described above may be prepared by any conventional method such as for example the methods described in U.S. Pat. Nos. 4,416,929, 4,484,459, 4,550,054 and 4,567,738.

The structural fabrics may be further shaped if desired by processes such as those described in U.S. Pat. Nos. 4,664,961 and 4,681,049. The shaped fiber form will generally have a shape closely approximating the final shape of the desired composite article.

The resin holding thread of the present invention may be used with any process of preparing a fiber form which requires intralayer, interlayer or additional stitching to maintain the orientation of the structural fibers or the integrity of the resulting fiber form. The resin holding threads are particularly useful in the specific patented processes noted above.

After a fiber form has been prepared and stabilized by stitching with resin holding threads, the fiber form is infused or impregnated with a curable matrix resin. The matrix resin may be infused by any suitable method such as for example the "resin film infusion method" described in U.S. patent application Ser. No. 06/994,446 filed Dec. 22, 1986. When the fiber form has been sufficiently saturated with the resin, the saturated fiber form is molded to its final shape while the resin is cured by the application of heat and/or pressure. Curing can be affected by the use of a conventional autoclave or a process such as the "Autocomp" process of U.S. patent application Ser. No 06/994,446. During the curing temperature range, the resin holding threads melt and allow relaxation of the structural fibers to substantially eliminate resin rich areas in the final cured composite article. After cooling, the cured article may be trimmed to the exact dimensions of the desired article.

The process of the present invention can be used with any product having a wide variety of shapes and sizes. The resin holding threads may be used for intralayer or interlayer stitching, stitching in the direction normal to the fabric plane, edge stitching, and any other stitching which is required for the desired fiber form. The composite articles produced using the present process exhibit substantially fewer resin rich areas, superior resistance to microcracking and disbonding and enhanced raw material property translation into the composite article.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for preparing a non-porous oriented fiber reinforced hardened composite material, comprising the steps of:
  preparing a fabric comprised of at least one ply of commonly oriented fibers;
  stabilizing a plurality of said fabrics adjacent each other by knitting or stitching said fabrics together, with at least one course of resin holding thread, to form a stabilized fiber form having a distorted fiber orientation due to the stitching operation;
  substantially surrounding said fibers and said thread of said stabilized fiber form, with a curable resin to form a non-porous fiber reinforced composite material, and
  heating said composite material to melt a portion of said resin holding thread to relax the distorted fiber orientation and cure said resin to produce said hardened composite.

* * * * *